(12) United States Patent
Helfer et al.

(10) Patent No.: US 6,463,726 B1
(45) Date of Patent: Oct. 15, 2002

(54) HAY HARVESTING MACHINE PROVIDED WITH AT LEAST A SWATHING ROTOR EQUIPPED WITH A DEFLECTOR WITH ADJUSTABLE POSITION

(75) Inventors: Marc Helfer, Niederschaeffolsheim; Michel Quirin, Allenwiller, both of (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 09/673,664

(22) PCT Filed: Mar. 3, 2000

(86) PCT No.: PCT/FR00/00526

§ 371 (c)(1),
(2), (4) Date: Nov. 6, 2000

(87) PCT Pub. No.: WO00/52992

PCT Pub. Date: Sep. 14, 2000

(30) Foreign Application Priority Data

May 3, 1999 (FR) .............................................. 99 02854

(51) Int. Cl.⁷ ................................................ A01D 78/10
(52) U.S. Cl. .............................. 56/365; 56/370; 56/377
(58) Field of Search .......................... 56/377, 370, 396, 56/DIG. 21, DIG. 29, 365, 366, 376, 399

(56) References Cited

U.S. PATENT DOCUMENTS

| | | | | |
|---|---|---|---|---|
| 4,015,411 A | * | 4/1977 | Van Der Lely et al. | ...... 56/366 |
| 4,128,987 A | * | 12/1978 | Zweegers | .................... 56/377 |
| 4,212,143 A | * | 7/1980 | Chaumont | ................... 56/14.4 |
| 5,274,990 A | * | 1/1994 | Aron et al. | ..................... 56/377 |
| 5,685,136 A | * | 11/1997 | Aron | ............................. 56/367 |
| 5,743,075 A | | 4/1998 | Aron et al. | |
| 6,050,076 A | | 4/2000 | Aron et al. | |

FOREIGN PATENT DOCUMENTS

| | | | | |
|---|---|---|---|---|
| CH | 477807 | * | 9/1969 | .......... A01D/81/00 |
| DE | 2127701 | * | 10/1972 | .......... A01D/84/00 |
| DE | 9400521 | * | 3/1994 | .......... A01D/78/10 |
| EP | 763321 | * | 3/1997 | .......... A01D/78/10 |
| EP | 845199 | * | 11/1997 | .......... A01D/78/10 |
| FR | 2700916 | * | 8/1994 | .......... A01D/78/10 |

* cited by examiner

Primary Examiner—Robert E. Pezzuto
Assistant Examiner—Árpád F. Kovács
(74) Attorney, Agent, or Firm—Oblon, Spivak, McClelland, Maier & Neustadt, P.C.

(57) ABSTRACT

A hay harvesting machine including a frame with several windrowing rotors, the frame including a draft beam and a connecting beam which is articulated with respect to the draft beam, at least the rotor of the connecting beam located farthest back being equipped with a windrowing deflector. The machine includes a retractable stop for the movement of the connecting beam about its axis of articulation, and a device for shifting the deflector notably with respect to the corresponding rotor. A device controls the stop, which device is actuated by the shifting device. The stop prevents the connecting beam and the corresponding rotor from moving from a first work position into a second work position as long as the deflector can collide with the rotor which precedes it. When the deflector is shifted into a position where the risk of collision is eliminated, the stop is retracted and the change in position is possible.

14 Claims, 6 Drawing Sheets

HAY HARVESTING MACHINE PROVIDED WITH AT LEAST A SWATHING ROTOR EQUIPPED WITH A DEFLECTOR WITH ADJUSTABLE POSITION

BACKGROUND OF THE INVENTION

1. Field of the Invention

The present invention relates to a hay harvesting machine, particularly a windrower for cut crops, including a frame with several windrowing rotors, which windrowing rotors are driven in rotation during work about approximately vertical axes which are fitted with supports equipped with carrier wheels, said frame comprising a draft beam and a connecting beam to which at least one of the windrowing rotors is connected, the connecting beam being articulated with respect to the draft beam so that it can be moved with the rotor or rotors connected to it laterally to the right and/or to the left, at least the rotor of the connecting beam which is located furthest back being equipped with a windrowing deflector, the position of which is adjustable.

2. Discussion of the Background

In a machine of this kind, the windrowing deflector of the rearmost rotor limits the extent to which the fodder can be thrown out sideways and encourages the formation of a uniform windrow. The distance between the deflector and said rotor is advantageously adjustable so as to be able to tailor it to the mass and nature of the plant matter that is to be windrowed. When said mass is low, it is preferable for the deflector to be brought closer to the rotor so that the windrow will not be too spread out. Conversely, when the mass of plant matter is high, the deflector needs to be moved away from the rotor so that the windrow can be formed correctly and not be compacted. Furthermore, when the rearmost rotor is moved, with the connecting beam, from a first work position in which said rotor is on the left-hand side with respect to the rotor which precedes it, into a second work position in which it is on the right-hand side with respect to the rotor which precedes it, the corresponding windrowing deflector has to be removed to prevent it from colliding with said rotor which precedes it.

This operation is tedious to perform; in addition, it may be forgotten. When this happens, the collision between the deflector and the preceding rotor would cause serious damage.

SUMMARY OF THE INVENTION

The object of the present invention is to provide a hay harvesting machine as described in the introduction and which does not have the aforementioned drawbacks.

To this end, one important feature of the invention consists in the fact that the machine includes a retractable stop for the movement of the connecting beam about its axis of articulation, means allowing the windrowing deflector to be shifted notably with respect to the corresponding rotor and a device for controlling the stop, which device is actuated by the means for shifting the windrowing deflector.

In this arrangement, the stop prevents the connecting beam and the corresponding rotor from being moved from the first work position into the second work position as long as the deflector can collide with the rotor which precedes it. By contrast, when the deflector is shifted into the position in which the risk of collision is eliminated, the stop is retracted and the change in position can be performed.

In addition, as the adjusting of the stop is combined with that of the windrowing deflector, it occurs automatically and requires no special attention on the part of the user. The machine according to the invention can be operated simply and without risk.

BRIEF DESCRIPTION OF THE DRAWINGS

Other features and advantages of the invention will become apparent from the description which will follow and which refers to the appended drawings which, by way of nonlimiting examples, represent some embodiments of the machine according to the invention.

In these drawings.

DESCRIPTION OF THE PREFERRED EMBODIMENTS

Figure 1:
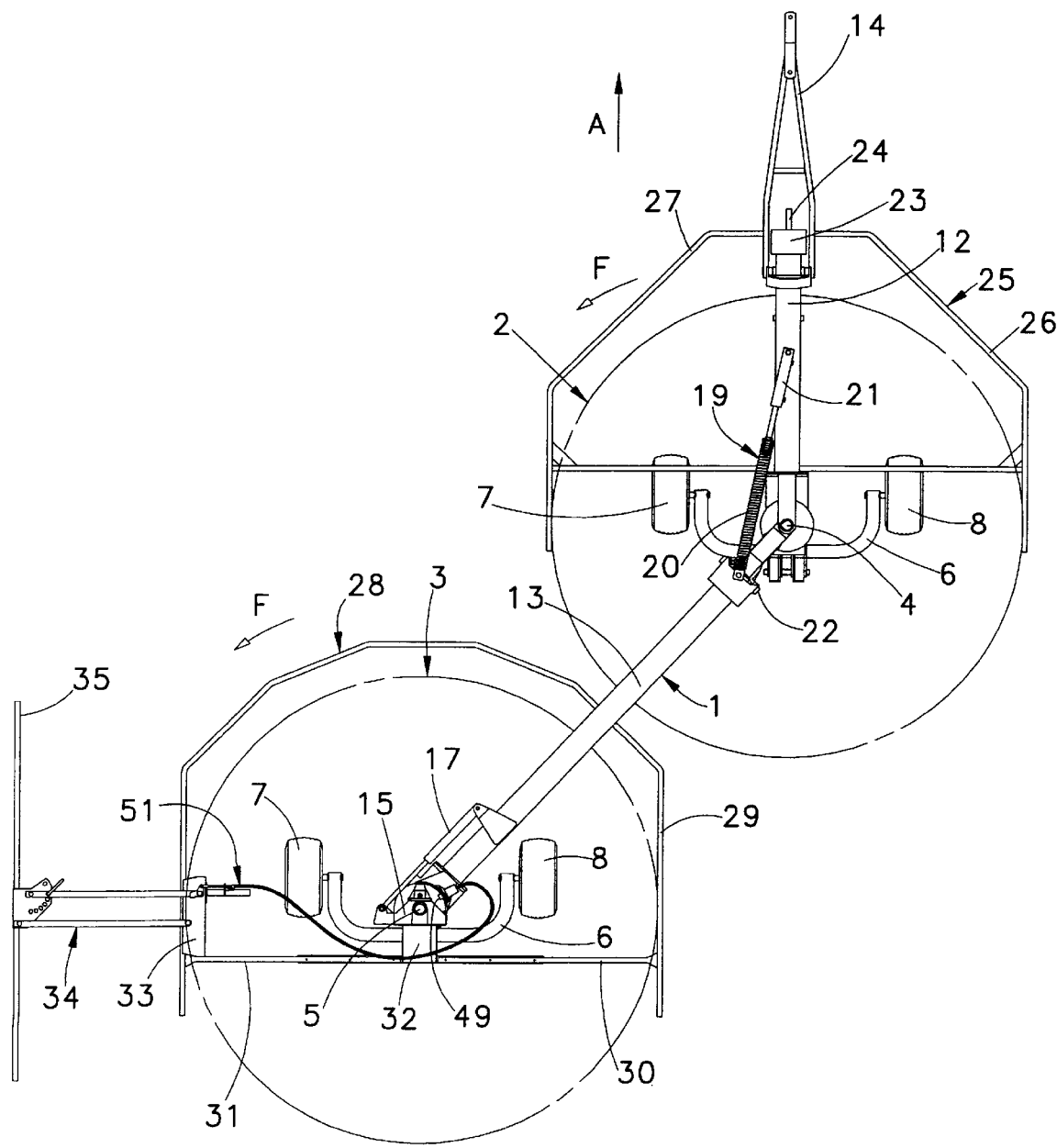
FIG. 1 depicts a top view of a machine according to the invention in a first work position.

As depicted in FIGS. 1 to 4, the machine according to the invention includes a frame (1) which carries two windrowing rotors (2 and 3) located a certain distance one behind the other. These rotors (2 and 3) are mounted so that they can rotate on essentially vertical axes (4 and 5). At its lower end, each of these axes (4 and 5) bears a support (6) equipped with two carrier wheels (7 and 8). This support (6) is adjustable in the height with respect to the corresponding axis (4, 5) so as to be able to alter the distance of the corresponding rotor (2, 3) with respect to the ground.

Figure 2:
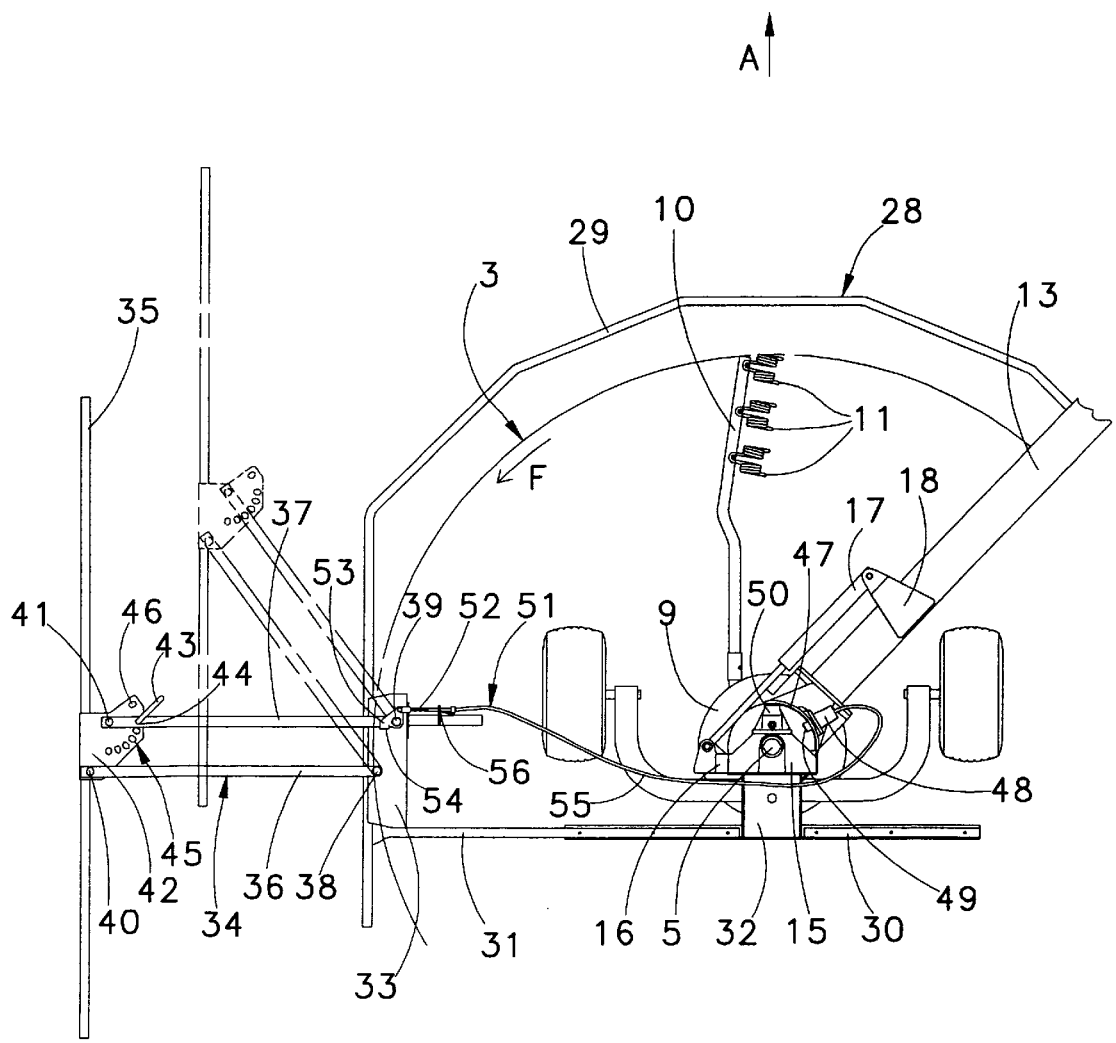
FIG. 2 depicts, on a larger scale, a detail view of the rear rotor of the machine.
Figure 4:
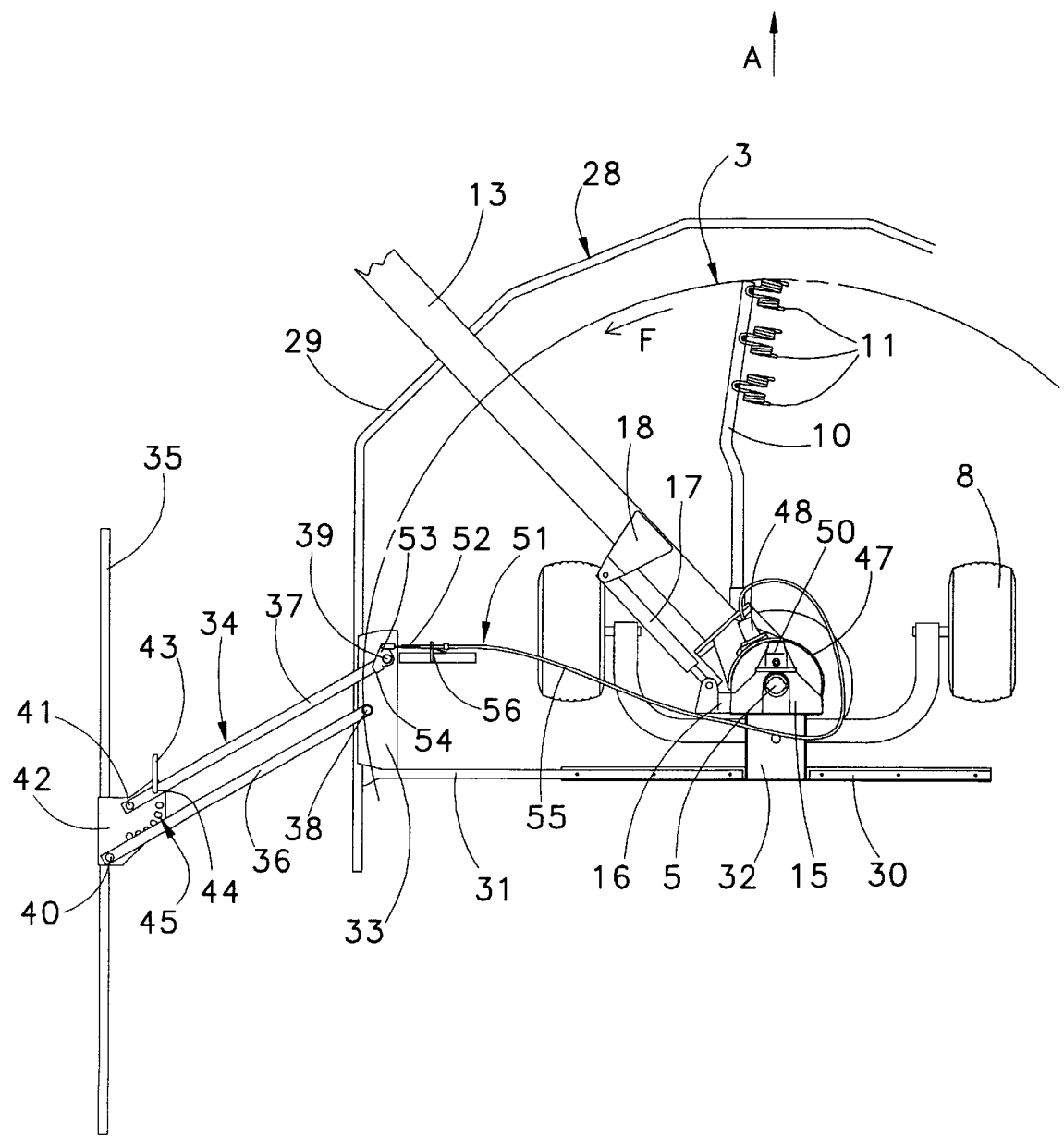
FIG. 4 depicts a detail view of the rear rotor in the second work position.

Each of these rotors (2, 3) is essentially made up of a central casing (9) mounted on the corresponding axis (4,5) by means of ball bearings. This central casing (9) carries several arms (10) which extend in a practically horizontal plane. Only one of these arms (10) is depicted in FIGS. 2 and 4 in order to keep the drawings clear. At their ends furthest from said central casing (9) they are fitted with raking forks (11). Each of these arms (10) is mounted in a bearing of the corresponding central casing (9) so that it can pivot on itself, that is to say about its longitudinal geometric axis. In the central casing (9) there is an operating cam which is fixed to the corresponding axis (4, 5). Each of these fork-bearing arms (10) has, at its end located inside the central casing (9), a roller which collaborates with said operating cam.

The frame (1) comprises a draft beam (12) and a connecting beam (13). The draft beam (12) is fixed to the upper end of the approximately vertical axis (4) of the furthest forward rotor (2) (when viewed in the direction of forward travel (A)). It extends over this rotor (2) forward beyond its fork-bearing arms (10). At its front end it has a draw bar (14) which allows for hitching to a tractor which is used to drive the machine and pull it along. One of the ends of the connecting beam (13) is articulated to the approximately vertical axis (4) of the furthest forward rotor (2) so as to be able to pivot about it. It could just as easily be articulated to an approximately vertical axis secured directly to the draft beam (12). The other end of the connecting beam (13) is articulated to the approximately vertical axis (5) of the second rotor (3). This axis (5) can turn on itself with respect to the beam (13). At its upper end it has a sleeve (15). This is immobilized on said end using a means such as a key or a pin. This sleeve (15) has a lateral arm (16) to which the rod of a hydraulic ram (17) is articulated. The body of this hydraulic ram (17) is articulated to a clevis (18) secured to the connecting beam (13). Said hydraulic ram (17) can be controlled from the tractor. It allows the sleeve (15) to be shifted in such a way that it causes the approximately vertical axis (5) to turn on itself. A third rotor approximately identical to the rotors (2 and 3) could be arranged between the latter in the case of a machine with a greater working width.

A retaining device (19) is placed between the draft beam (12) and the connecting beam (13) to encourage the rearmost rotor (3) to position itself in a position which is laterally offset with respect to the first rotor (2) during work. In the example depicted, this retaining device (19) is made up of a draw-spring (20) and of a hydraulic ram (21). Said spring (20) is attached, via one of its ends, to the connecting beam (13) and, via its other end, to the rod of the hydraulic ram (21), the body of which is articulated to the draft beam (12).

The connecting beam (13) has an approximately horizontal axis of articulation (22). This axis of articulation (22) extends transversely to the beam (13) and is made in two parts aligned with one another so as to leave the inside of the beam (13) free. It is located near the approximately vertical axis (4) of the furthest forward rotor (2). This situation allows the rearmost rotor (3) to move heightwise about said axis (22) to closely follow the unevennesses of the ground.

The two rotors (2 and 3) are driven in rotation mechanically off the tractor power take-off. For this purpose, the draft beam (12) has, at its front end, an input casing (23) with a shaft (24) to which a cardan shaft driven off the tractor can be connected. Housed in the draft beam (12) is a first transmission shaft which runs from the input casing (23) to the central casing (9) of the furthest forward rotor (2). At its rear end, it carries a pinion which meshes with a gear ring secured to the central casing (9) of this rotor (2). A second transmission shaft which is housed in the connecting beam (13) extends between the two rotors (2 and 3). At its front end it has a pinion which meshes with the gear ring secured to the central casing (9) of the front rotor (2) and at its rear end has a pinion which meshes with a second gear ring secured to the central casing (9) of the rearmost rotor (3). This second transmission shaft has a cardan or similar joint in the region of the axis of articulation (22) of the connecting beam (13).

The draft beam (12) carries a guard device (25) which surrounds at least the front half of the furthest forward rotor (2). This guard device (25) consists essentially of bent tubes (26 and 27). A second guard device (28) surrounds the front half of the rearmost rotor (3). It consists of one bent tube (29) which is fixed to two transverse supports (30, 31). These supports (30, 31) are themselves fixed to a spacer piece (32) which is connected to the sleeve (15) secured to the approximately vertical axis (5).

The guard device (28) and said support (31) carry a plate (33) on which means (34) for shifting a windrowing deflector (35) located on the lateral side of the rearmost rotor (3) are articulated. These means (34) consist of two levers (36 and 37) which are articulated with approximately vertical first axes (38 and 39) to the plate (33) and with approximately vertical second axes (40 and 41) to a lug (42) carrying the deflector (35). The two levers (36 and 37), the plate (33) and the lug (42) form a deformable parallelogram allowing the deflector (35) to be adjusted into several relatively closely spaced positions to tailor it to the volume of the windrow formed. Said deflector (35) can be immobilized in these positions using a pin (43). The lever (37) has an orifice (44) through which said pin (43) can pass. The lug (42) has several orifices (45) which are slightly spaced apart and which can be brought under the orifice (44) of the lever (37). Thus, the pin (43) can also be inserted into one of these orifices (45) with a view to immobilizing the lug (42) and the deflector (35) with respect to the lever (37) in the chosen position. The arrangement of the levers (36 and 37) makes it possible to keep the deflector (35) oriented in the direction of forward travel (A) in each of these positions.

The lug (42) has an additional orifice (46) which is further away from the aforementioned orifices (45) and located forward of these. The deflector (35) can be pivoted toward the rear through a relatively large angle, approximately 30° or more, using the levers (36 and 37) and be stopped in a rear position by engaging the pin (43) in the orifice (44) of the lever (37) and in the additional orifice (46) of the lug (42).

Near its rear end, the connecting beam (13) has a rim (47) in the shape of an arc of a circle, with a housing (48) located on the right-hand side with respect to the middle of said beam (13). Located in this housing (48) is a retractable stop (49). This consists of a cylinder which faces horizontally toward the approximately vertical axis (5) of the rear rotor (3). This stop (49) can be shifted longitudinally in said housing. It is associated with a pressing spring which is also located in the housing (48). This spring pushes the stop (49) toward an active position in which it extends partially out of the housing (48) and beyond the rim (47).

The sleeve (15) which is secured to the approximately vertical axis (5) of the rearmost rotor (3) has a lock (50) located in front of said axis (5). This lock (50) is directed in the direction of forward travel (A) and extends right up close to the rim (47). It moves with the axis (5) and the sleeve (15) when these are shifted in rotation using the hydraulic ram (17). The retractable stop (49) is arranged in such a way that in the active position it extends into the zone of travel of said lock (50).

The retractable stop (49) is connected to a control device (51) which is actuated by the means (34) for shifting the windrowing deflector (35). This device (51) allows it to be shifted longitudinally from the active position into an inactive position in which it is further or completely retracted into the housing (48) and vice versa. Said device (51) includes a control cable (52) which is connected to the end of the stop (49) located in the housing (48) and to a small plate (53) which is articulated on the essentially vertical axis (39) which also articulates the lever (37) to the plate (33). This small plate (53) has a driving block (54) which extends in the zone of travel of the lever (37) and is driven along thereby when this lever is shifted backward. The control cable (52) is guided in a sheath (55) which lies between the wall of the housing (48) and a lock (56) provided near the small plate (53).

The example of embodiment according to FIGS. 5 and 6 has numerous parts in common with the embodiment described hereinabove. These parts will not be described further in detail but will be designated by the same references. In this embodiment, the lever (36) of the means (34) of shifting the deflector (35) is connected to the connecting beam (13) via a rod (57). One of the ends of this rod (57) is articulated to a lug (58) of the lever (36) by means of an approximately vertical axis (59). The other end of the rod (57) is articulated to an approximately vertical axis (60) which is screwed onto a threaded rod (61) itself connected to the connecting beam (13). This threaded rod (61) is free to rotate and prevented from translational movement. A cranking handle (62) allows it to rotate on itself. The axis (61) therefore shifts longitudinally along this threaded rod (61) and carries the rod (57) along. The latter actuates the lever (36) in such a way that it pivots about its axis of articulation (38) and alters the position of the windrowing deflector (35) with respect to the rotor (3). The rod (57) is made in two parts (63 and 64) sliding one inside the other. These two parts (63 and 64) can be immobilized one with respect to the other using a pin (65) which is removable.

Figure 6:
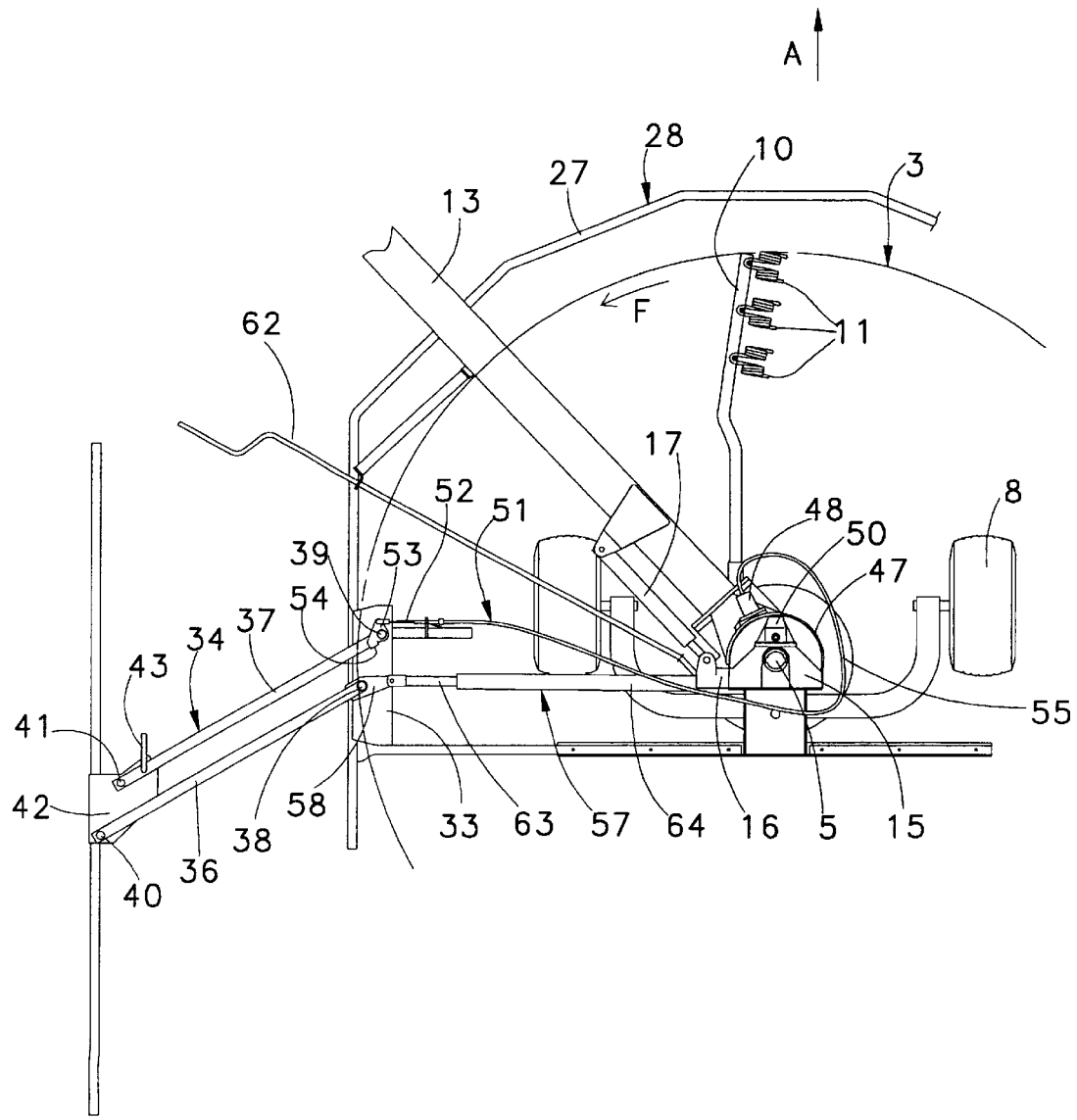
FIG. 6 depicts the rotor according to FIG. 5 in the second work position.

The lug (42) has an orifice (66) for immobilizing the deflector (35) with respect to the lever (37) when it is shifted rearward into the second work position (FIG. 6).

During work, the windrower is coupled up to a tractor using a draw bar (14) and is moved along in the direction (A). In the first work position depicted in FIGS. 1 and 2, the rearmost rotor (3) is offset laterally to the left with respect to the furthest forward rotor (2). They are thus arranged in a line which is oblique with respect to the direction of forward travel (A) so that their paths partially overlap. The rearmost rotor (3) is placed in this offset position using the hydraulic ram (17) which is actuated to cause it to lengthen and by means of the retaining device (19) which pulls on the connecting beam (3). During said lengthening, the hydraulic ram (17) orients the sleeve (15), the approximately vertical axis (5) and the support (6) with the wheels (7 and 8) toward the left-hand side so that these cause said offset.

The two rotors (2 and 3) are driven in rotation in the same direction (F) off the tractor power take-off. As a result of this rotation, the rollers located at the ends of the fork-bearing arms (10) move in the cam housed in the corresponding casing (9). This cam controls said arms (10) such that the forks (11) are directed toward the ground in the front part of their path and such that they pivot upward in the lateral part of their path in which they are traveling backward (when viewed in the direction of forward travel (A)). In said front part, the forks (11) collect up the fodder lying on the ground. They then set it down in the form of a windrow by virtue of their pivoting in the lateral part of their path. Because of the layout of the two rotors (2 and 3) the windrow formed by the furthest forward rotor (2) is taken up again by the other rotor (3) which forms a larger-volume single windrow. The width of this windrow is limited by the deflector (35). The latter can be shifted forward and be brought closer to the rotor (3) by means of the levers (36 and 37) with a view to reducing the width of the windrow. An intermediate position of the deflector (35) is depicted in broken line in FIG. 2. This deflector can be immobilized in various positions using the pin (43) which can be engaged in the orifice (44) of the lever (37) and in one of the orifices (45).

In this first work position of the windrower, the lever (37) exerts no action on the block (54) of the small plate (53). The control cable (52) is released which allows the spring in the housing (48) of the stop (49) to push this stop into its active position. This stop (49) therefore extends partially out of the housing (48) and lies in the zone of travel of the lock (50). It thus prevents the rear rotor (3) from pivoting toward the right-hand side of the machine.

Figure 3:
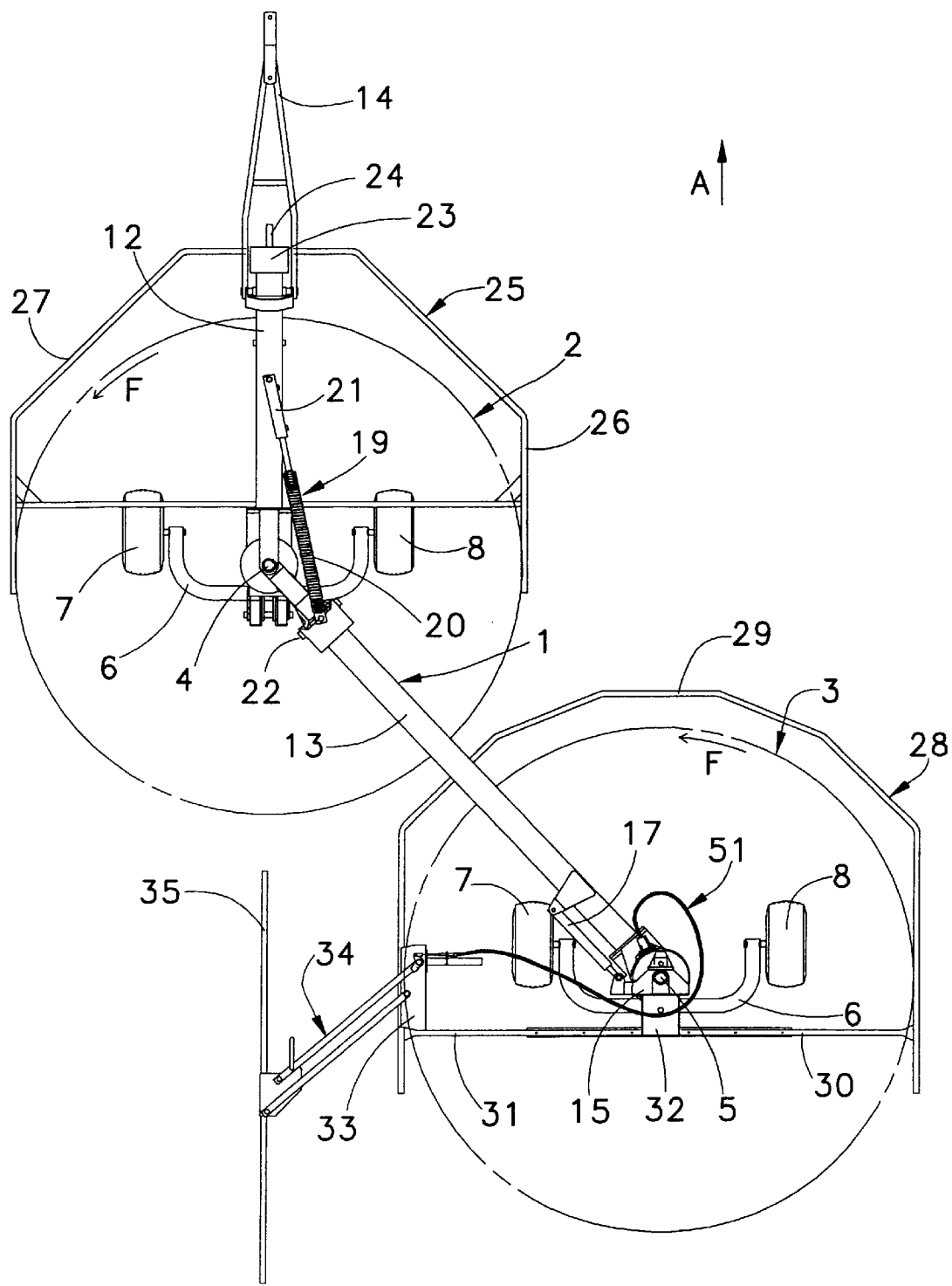
FIG. 3 depicts a top view of the machine according to the invention in a second work position.

In the second work position which is depicted in FIGS. 3 and 4, the rearmost rotor (3) is offset laterally to the right with respect to the front rotor (2). In this position, each rotor (2 and 3) forms its own windrow, which may prove advantageous when the product which is to be windrowed is very dense and bulky. To move into this position, the user has first of all to shift the deflector (35) notably backward, so that it will not collide with the front rotor (2). To do this, he disengages the pin (43) and pivots the deflector (35) backward using the levers (36 and 37) until he can engage the pin (43) in the orifice (44) on the lever (37) and the orifice (46) of the lug (42). During this pivoting, the lever (37) carries the block (54) along and causes the small plate (53) to pivot on the axis (39). This plate pulls on the control cable (52) which slides in the sheath (55) and at the other end pulls the stop (49) into the housing (48). This stop (49) is thus retracted and frees the zone of travel for the lock (50). The user then, on the one hand, actuates the hydraulic ram (21) to cause it to lengthen and release the spring (20) and, on the other hand, actuates the hydraulic ram (17) to cause it to shorten and cause the sleeve (15), the approximately vertical axis (5) and the support (6) with the carrier wheels (7 and 8) to turn to the right (when viewed in the direction of forward travel (A)). When the machine is thus moved along in the direction of forward travel (A), the carrier wheels (7 and 8) automatically point themselves in this direction and cause the connecting beam (13) to turn to the right about the approximately vertical axis (4) of the front rotor (2). The rear rotor (3) therefore reaches the position depicted in FIG. 4. The deflector (35) is on the lateral side of the rear rotor (3) and set back far enough from the front rotor (2) not to collide with it. The control cable (52) keeps the stop (49) in the retracted position. Finally, the hydraulic ram (21) is actuated to cause it to tension the spring (20) once again, which spring keeps the connecting beam (13) in the new position.

To return to the first work position, all that is required is for the spring (20) of the retaining device (19) to be relaxed, the hydraulic ram (17) to be actuated so that it directs the carrier wheels (7 and 8) to the left and for the machine to be moved forward. The stop (49) remains in the retracted position until the deflector (35) has been shifted forward using the levers (36 and 37) into the first work position. The lever (37) then releases the block (54) and the small plate (53) which releases the control cable (52). The spring which is located in the housing (48) then pushes the stop (49) into the active position where it once again limits the possibilities of pivoting of the connecting beam (13) about the axis (4) of the front rotor (2).

For transport, the rear rotor (3) can be placed behind the front rotor (2) and the deflector (35) can be brought up against said rear rotor (3) with a view to reducing the width of the machine.

Figure 5:
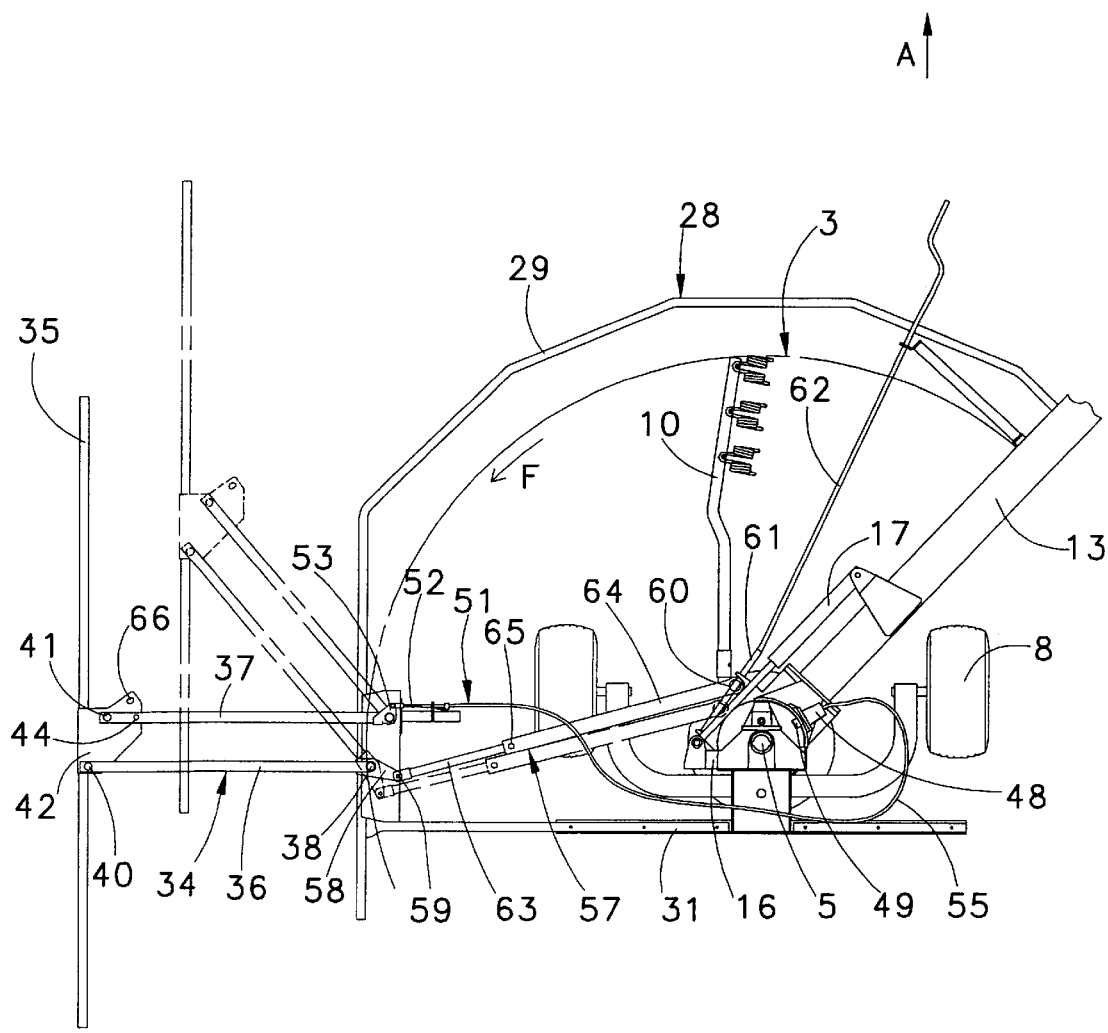
FIG. 5 depicts a view similar to that of FIG. 2, of another embodiment.

In the embodiment of FIGS. 5 and 6, the position of the deflector (35) in the first work position can be adjusted using the cranking handle (62) and the rod (57). The latter automatically shifts the deflector (35) by way of the lug (58) and of the lever (36) when its axis (60) is shifted along the threaded rod (61). These means make it possible to effect a more accurate adjustment of the distance between the deflector (35) and the rearmost rotor (3).

To move the rear rotor (3) into the second work position, the pin (65) has to be pulled out of the rod (57) and the two parts (63 and 64) allowed to slide. The deflector (35) can then be shifted notably rearward using the levers (36 and 37). This position is depicted in FIG. 6. It can be stopped in this position by introducing the pin (65) or another pin (43) into the orifice (44) of the lever (37) and the orifice (66) of the lug (42). Said shift of the deflector (35) causes the stop (49) to be shifted into the inactive position, via the block (54) of the small plate (53) and the control cable (52). The lock (50) can thus pass so as to move the beam (13) and the rotor (3) into the second work position as has been described in conjunction with the first embodiment. To return to the first work position, the operator performs the operations in reverse and once again immobilizes the two parts (63 and 64) of the rod (57) using the pin (65).

It is quite obvious that the invention is not restricted to the examples of embodiments described and depicted in the appended drawings. Modifications remain possible, particularly as regards the construction of the various elements or by substituting technical equivalents, without in any way departing from the field of protection.

What is claimed as new and desired to be secured by Letters Patent of the United States is:

1. A hay harvesting machine for a windrower for cut crops, comprising:
   a frame;
   several windrowing rotors secured to said frame and which are driven in rotation during work about approximately vertical axes;
   supports equipped with carrier wheels and which are fitted to said vertical axes, said frame comprising,
   a draft beam, and
   a connecting beam to which at least one of the windrowing rotors is connected, said
   connecting beam being articulated with respect to the draft beam so that said connecting beam can move with the at least one of the windrowing rotors connected thereto laterally to the right and to the left;
   means for causing said moving the connecting beam and the at least one of the windrowing rotors connected thereto;
   a windrowing deflector equipping at least a corresponding rotor of the connecting beam which is located farthest back, a position of said windrowing deflector being adjustable by means for shifting the windrowing deflector with respect to the corresponding rotor;
   retractable stop means for allowing or hindering said moving of the connecting beam and the at least one of the windrowing rotors connected thereto from one lateral position to the other; and
   a device for controlling the retractable stop means, said controlling device being actuated by the means for shifting the windrowing deflector.

2. The machine as claimed in claim 1, wherein the windrowing deflector can be pivoted backward with the aid of the means for shifting the windrowing deflector with a view to moving said corresponding rotor located farthest back and the connecting beam from a first work position into a second work position.

3. The machine as claimed in claim 1, wherein the retractable stop means includes a cylinder pushed into an active position.

4. The machine as claimed in claim 3, wherein the retractable stop means is located on the connecting beam, near to the end connected to said corresponding rotor located farthest back and which rotor is equipped with the windrowing deflector.

5. The machine as claimed in claim 4, wherein the approximately vertical axis of said corresponding rotor located farthest back can pivot on itself and carries a lock.

6. The machine as claimed in claim 5, wherein the retractable stop means extends in the active position into a zone of travel of said lock which is connected to the approximately vertical axis of said corresponding rotor located farthest back.

7. The machine as claimed in claim 5, wherein the means for shifting the windrowing deflector comprise two levers which are articulated to a plate connected to the approximately vertical axis of said corresponding rotor located farthest back and to a lug carrying the windrowing deflector, said two levers forming two sides of a deformable parallelogram.

8. The machine as claimed in claim 7, wherein the device for controlling the retractable stop means comprises a control cable connected to said retractable stop means and to a small plate articulated to the plate which is connected to the approximately vertical axis of said corresponding rotor located farthest back.

9. The machine as claimed in claim 8, wherein the control cable is guided in a sheath.

10. The machine as claimed in claim 8, wherein the small plate includes a driving block extending into a zone of travel of one of the two levers for shifting the windrowing deflector.

11. The machine as claimed in claim 9, wherein the sheath guiding the control cable lies between a wall of a housing of the retractable stop means on the connecting beam and a lock located near to the small plate.

12. The machine as claimed in claim 7, wherein one of said two shifting levers is connected to the connecting beam by a rod which can be rendered inoperative.

13. The machine as claimed in claim 12, wherein said rod is made in two sliding parts which can be immobilized one with respect to the other by a removable pin.

14. The machine as claimed in claim 10, wherein the windrowing deflector is configured to be immobilized using a pin in a position in which said one of the two levers for shifting said windrowing deflector keeps the driving block and the small plate in a position in which the small plate pulls on the control cable of the control device thereby retracting the retractable stop means from the zone of travel of said lock.

* * * * *

UNITED STATES PATENT AND TRADEMARK OFFICE
CERTIFICATE OF CORRECTION

PATENT NO.     : 6,463,726 B1
DATED          : October 15, 2002
INVENTOR(S)    : Helfer et al.

It is certified that error appears in the above-identified patent and that said Letters Patent is hereby corrected as shown below:

<u>Title page,</u>
Item [30], Foreign Application Priority Data, should read:

-- [30]          Foreign Application Priority Data
         Mar. 5, 1999     (FR) ........................ 99 02854 --

Signed and Sealed this

Fourth Day of February, 2003

JAMES E. ROGAN
*Director of the United States Patent and Trademark Office*